United States Patent [19]

Goldberg

[11] Patent Number: 5,457,732
[45] Date of Patent: Oct. 10, 1995

[54] METHOD AND APPARATUS FOR DELIVERY OF A RESPONSE IN A MESSAGING SYSTEM

[75] Inventor: Steven J. Goldberg, Coral Springs, Fla.

[73] Assignee: Motorola, Inc., Schaumburg, Ill.

[21] Appl. No.: 202,611

[22] Filed: Feb. 28, 1994

[51] Int. Cl.$^6$ .................................................. H04Q 7/12
[52] U.S. Cl. .............................. 379/57; 379/58; 379/89; 379/201
[58] Field of Search ............................ 379/57, 58, 63, 379/67, 89, 97, 201, 209

[56] References Cited

U.S. PATENT DOCUMENTS

| | | | |
|---|---|---|---|
| 4,480,253 | 10/1984 | Anderson . | |
| 4,811,379 | 3/1989 | Grandfield . | |
| 4,926,460 | 5/1990 | Gutman et al. . | |
| 5,090,051 | 2/1992 | Muppidi et al. | 379/63 |
| 5,109,220 | 4/1992 | Breeden et al. | 379/57 |
| 5,144,648 | 9/1992 | Bhagat et al. | 379/89 |
| 5,202,912 | 4/1993 | Breeden et al. | 379/57 |
| 5,303,301 | 4/1994 | Takahata | 379/209 |
| 5,327,480 | 7/1994 | Breeden | 379/57 |
| 5,329,578 | 7/1994 | Brennan et al. | 379/67 |

FOREIGN PATENT DOCUMENTS

| | | | |
|---|---|---|---|
| 0029046 | 1/1989 | Japan | 379/97 |

OTHER PUBLICATIONS

Technology Concepts, Foster City, Calif., "The Only Voice/ Data Switch With Installation Options For Home Or Business Use", 1990, 2 Pages of a sales bulletin (no page numbers).

Primary Examiner—Dwayne D. Bost
Attorney, Agent, or Firm—James A. Lamb

[57] ABSTRACT

A system controller (102) operates in a messaging system (100) to deliver a response to a message. The response is communicated to a messaging terminal (115) at a response telephone number. The messaging terminal (115) includes a voice receive mode or a data receive mode, or both. A message input handler (404) receives the message and the response telephone number during a telephone call. A memory (408) stores the response telephone number in correspondence with the message. The message input handler (404) also receives the response, associates the message stored in the message memory with the response, and retrieves the response telephone number corresponding with the message associated with the response. A telephone response handler (420) delivers the response in accordance with the receive mode of the messaging terminal (115), using the retrieved response telephone number.

17 Claims, 9 Drawing Sheets

METHOD AND APPARATUS FOR DELIVERY OF A RESPONSE IN A MESSAGING SYSTEM

FIELD OF THE INVENTION

This invention relates in general to the delivery to a messaging terminal of a response to a message in a messaging system, and in particular to a method and apparatus for completing the delivery of a response to a voice or data mode messaging terminal used in a switched telephone network messaging system.

BACKGROUND OF THE INVENTION

As messaging terminals in selective call communication systems become more sophisticated, the management of messages and the messaging terminals, to handle a variety of types of messages and responses in a flexible and non-intrusive manner is becoming important for customer satisfaction. For example, a messaging terminal for use with a messaging system may consist of a telephone handset and a digital messaging device which share a common telephone line. The telephone is used to generate a voice or DTMF selective call message while the digital messaging device is used to generate a digital selective call message, which are often stored for queued delivery. The originator of such a message may expect a response in digital form, or by a voice telephone call from the responding party. Additionally, unsolicited voice messages may be received at the messaging terminal in the form of voice telephone calls. The user of the messaging terminal may prefer, and expect, to receive responses to messages in digital form, as would be necessary when the response is a sophisticated alphanumeric message which cannot be easily synthesized by a computer in the messaging system. When the messaging terminal is a digital only device, without a telephone handset, the response would be needed in digital form. On the other hand, the user may have both a handset and a digital messaging device and the user may prefer and expect a voice response, either "real time", or stored.

A known means of delivering voice and data messages to a messaging terminal which may be receiving it at a handset or by a digital device, which has been used successfully, is to use a signal unique to data transfer protocols at the beginning part of a response call. An example is a modem connect signal, used by modems to establish a call setup in accordance with standard protocols. When the messaging terminal answers a response telephone call, the messaging terminal responds with a modem connect signal, after which the messaging system controller can then complete the setup and perform a data transfer of the response. In systems using this feature to identify the message type, the user who expects a voice message can be annoyed by hearing data signals upon answering a call with the handset, or by having to wait while the messaging terminal determines whether a modem is at the other end of the telephone call before connecting the handset to the telephone call.

Another message management issue in more sophisticated messaging systems is the need to route responses to a message to a phone number other than the phone number used to originate the message. This flexibility is becoming more important as customers become more familiar with messaging systems at the same time as messaging systems are becoming larger in scope—leading to higher probability of response delays. Longer response delays lead to the situation where the message originator will be at another phone number when the response is expected to be received. A similar situation arises when the originator receives a response but immediately forwards it to another phone number for handling by a third party.

Thus, what is needed is a method and apparatus to efficiently deliver responses to designated messaging terminals, completing the delivery of a data or voice response in the manner preferred by the user of the messaging terminal which receives the response, and without delivering intrusive data signals to the user's handset during the delivery of the response call.

SUMMARY OF THE INVENTION

Accordingly, in a first aspect of the present invention a method for delivering a response to a message consists of the steps of receiving, storing, associating, retrieving, and delivering. The response is communicated through a messaging system including a switched telephone network (STN) to a messaging terminal at a response telephone number, using a system controller. The messaging terminal includes at least a voice receive mode or a data receive mode, and may include both. The system controller includes a telephone interface, a message input handler, a message memory, and a telephone response handler. In the step of receiving, the message and the response telephone number are received by the message input handler;

In the step of storing, the message and the response telephone number corresponding thereto are stored in the message memory. In the step of associating, the message stored in the message memory is associated with a response received by the system controller. In the step of retrieving, the response telephone number corresponding with the message associated with the response is retrieved from the message memory. In the step of delivering, the response is delivered using the retrieved response telephone number to establish a response telephone call coupled from the telephone interface through the STN to the messaging terminal. The response is delivered in accordance with the receive mode of the messaging terminal.

Accordingly, in a second aspect of the present invention, a method for receiving a response during a telephone call, at a messaging terminal operating in a messaging system, when the telephone call is not answered by a telephone handset prior to the expiration of an answer timer, consists of the steps of answering, sending, starting, canceling, and continuing. The response is a digital response or a voice response. When the response is digital, the telephone call includes at least a modem connect tone and the response. The messaging terminal includes a telephone interface, a telephone handset, a message controller, an answer timer having a predetermined duration until expiration, and a message memory.

In the step of answering, the telephone call is answered by coupling the telephone call from the messaging system to the message handler, using the telephone interface. In the step of sending, a voice prompt is sent after the step of answering. In the step of starting, a modem timer is started after the step of answering. The modem timer has a second predetermined duration until expiration, and does not expire when interrupted. In the step of starting, an analog recording is started of the received telephone call after the step of sending the voice prompt. In the step of canceling, the analog recording is canceled, the modem timer is interrupted, and the digital response is received when the modem connect tone is received prior to the expiration of the modem timer. In the step of continuing, the modem timer expires, and the analog recording is continued until the termination of the telephone call.

Accordingly, in a third aspect of the present invention a system controller operating in a messaging system for delivering a response to a message includes a telephone interface, a message input handler, a message memory, and a telephone response handler. The response is communicated through a messaging system, which includes a switched telephone network (STN), to a messaging terminal at a response telephone number. The messaging terminal includes a voice receive mode or a data receive mode, or both. The telephone interface is coupled to the STN and connects telephone calls to and from the STN. The message input handler is coupled to the telephone interface for receiving the message and the response telephone number during a telephone call. The message memory is coupled to the message input handler for storing the response telephone number in correspondence with the message. The message input handler also receives the response, associates the message stored in the message memory with the response, and retrieves the response telephone number corresponding with the message associated with the response. The telephone response handler, which is coupled to the message input handler and the telephone interface for delivering the response in accordance with the receive mode of the messaging terminal, uses the retrieved response telephone number to establish a response telephone call coupled from the telephone interface through the STN to the messaging terminal.

Accordingly, in a fourth aspect of the present invention, a messaging terminal for receiving a response during a telephone call includes a telephone handset, a telephone interface, and a message controller. The response is a digital response or a voice response. When the response is digital, the telephone call includes at least a modem connect signal and the response. The messaging terminal operates in a messaging system. The telephone handset is for audibly coupling a voice prompt and the voice response during the telephone call to a handset user. The telephone interface is coupled to the telephone handset, for connecting and receiving the telephone call from the messaging system and generating an off-hook signal when the telephone call is answered by lifting the handset. The message controller is coupled to the telephone interface for receiving the response. The message controller further includes an answer timer, a voice prompt generator, a modem connect signal detector, a modem, and a voice recorder.

The answer timer is responsive to the telephone interface, which expires when the telephone call has not been answered by the pick-up of the handset before the completion of a first predetermined period which starts when the telephone call is detected. The voice prompt generator is coupled to the telephone interface and responsive to the expiration of the answer timer. The voice prompt generator is for sending a voice prompt concluding with a record/modem signal. The modem connect signal detector is coupled to the telephone interface and is responsive to the modem connect signal. The modem timer is responsive to the answer timer and the modem connect signal detector, which expires when the modem connect signal is not received before the completion of a second predetermined period starting when the answer timer expires. The modem is coupled to the telephone interface and responsive to the modem connect signal detector and modem timer. The modem handles a digital exchange to receive the digital response when the modem connect signal is detected prior to the expiration of the modem timer. The voice recorder is responsive to the expiration of the answer timer for starting a recording of the telephone call, responsive to the expiration of the modem timer for completing the recording, and responsive to the modem connect signal detector for deleting the started recording,.

DETAILED DESCRIPTION OF THE INVENTION

Figure 1:
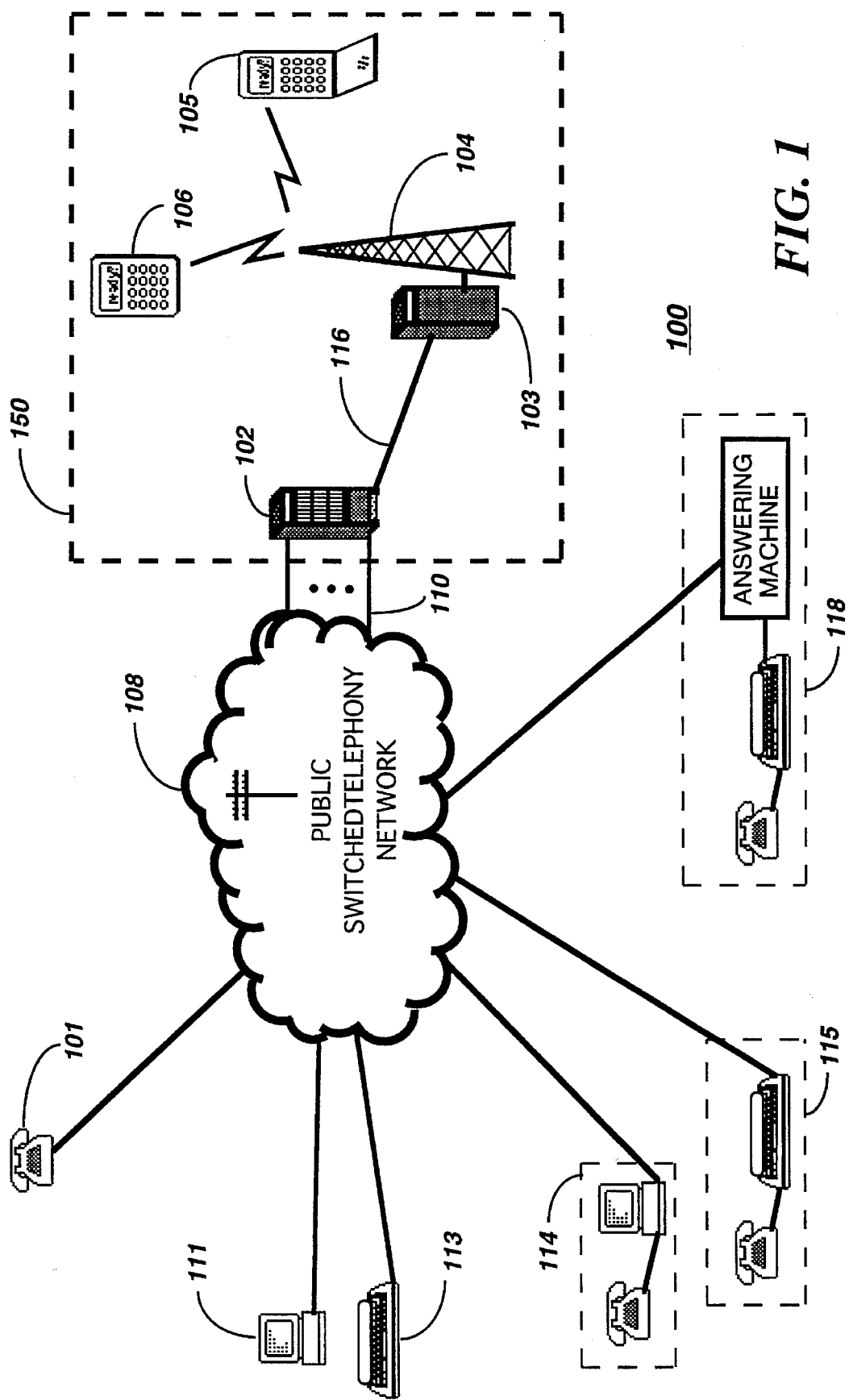
FIG. 1 is an electrical block diagram of a messaging system, in accordance with the preferred embodiment of the present invention.

Referring to FIG. 1, an electrical block diagram of a messaging system 100 is shown in accordance with the preferred embodiment of the present invention. The messaging system 100 comprises messaging terminal devices, such as a telephone 101, a computer 111, a desktop personal messaging unit 113 (such as a desktop page entry terminal), a telephone/computer combination messaging terminal 114, a telephone/desktop messaging unit combination messaging terminal 115, or a messaging terminal 118 comprising a desktop messaging unit (such as a desktop page entry terminal), a telephone handset, and an answering machine, coupled by a conventional public switched telephone network (PSTN) 108 to a system controller 102 through a plurality of telephone links 110. The phone links 110 may be a plurality of twisted wire pairs, or a multiplexed trunk line. The system controller 102 is coupled to and oversees the operation of radio frequency transmitter/receivers 103 (only one of which is shown), through communication links 116, which typically are twisted pair telephone wires, and additionally can include RF, microwave, or other high quality audio communication links. In message store and forward stations, transmitter/receiver 103 encodes and decodes inbound and outbound telephone addresses into formats that are compatible with land line message switch computers and personal radio telephone addressing requirements, such as cellular message protocols. The system controller 102 can also function to encode and decode paging messages which are transmitted or received by the radio frequency transmitter/receiver 103. Telephony signals are typically transmitted to and received from the system controller 102 by telephone sets such as the telephone 101, the telephone handset of the messaging terminal 114, the telephone handset of the messaging terminal 115, the telephone handset or answering machine of the messaging terminal 118, or a personal radio telephone 105. The computer of the messaging terminal 114 can interrupt the transmission path between the telephone handset and the computer when data messages are being transmitted between the computer and the PSTN 108. Similarly, the desktop messaging unit can interrupt the transmission path between the telephone and the desktop page entry terminal of the messaging terminal 115 when data messages are being transmitted between the desktop page entry terminal and the PSTN 108. The answering machine of the messaging terminal 118 can interrupt the handset and desktop page entry terminal when a voice message is being recorded on the answering machine. Telephony signals and data messages are transmitted from and received by at least one antenna 104 coupled to the radio frequency transmitter/receiver 103. The telephony signals are transmitted to and received from the personal radio telephone 105. The radio frequency transmitter/receiver 103 may also be used to transmit data or voice paging messages coupled from the system controller 102 to a portable receiving device 106 or the personal radio telephone 105, which have a keyboard and display. Acknowledgments to data messages, and data messages may also be received by the transmitter/receiver 103 from the portable receiving device 106 or the personal radio telephone 105, and are coupled to the system controller 102. The system controller 102, the communication link 116, the radio frequency transmitter/receiver 103, the antenna 104, the personal radio telephone 105, and the portable receiving device 106 comprise a selective call radio communication system 150 within the messaging system 100.

In the above description, the term "message" has been used to encompass both voice and data information transfers occurring in one direction with respect to a messaging terminal. These messages may be messaging terminal originated messages or responses to originated messages. In the following description, the term "message" is used to mean an originated message and the term "response" is used to mean a message or acknowledgment sent in response to an originated message.

It will be appreciated that other selective call radio terminal devices (not shown in FIG. 1), such as mobile cellular telephones, mobile radio data terminals, mobile cellular telephones having attached data terminals, or mobile radios (conventional and trunked) having data terminals attached, are also able to be used in the selective call radio communication system 150. In the following description, the term "radio terminal" will be used to refer to the personal radio telephone 105, or the portable receiving device 106 which includes, e.g., a portable radio capable of acknowledgement transmission), a mobile cellular telephone, a mobile radio data terminal, a mobile cellular telephone having an attached data terminal, or a mobile radio (conventional or trunked) having a data terminal attached. Each of the radio terminals assigned for use in the messaging system 100 has an address assigned thereto which is unique within the selective call radio communication system 150. The address enables the transmission of a message from the system controller 102 only to the selected radio terminal, and identifies messages and responses received at the system controller 102 from the radio terminal. Furthermore, each of one or more of the radio terminals also has a unique telephone number assigned thereto, the telephone number being unique within the PSTN 108. A list of the assigned addresses and correlated telephone numbers for the radio terminals is stored in the system controller 102 in the form of a subscriber data base. The radio terminals to which a telephone number is also assigned are hereafter identified as "switched radio terminals". In summary, it should be appreciated that within the messaging system 100, the messaging terminals 101, 111, 113, 114, 115, and 118 and the switched radio terminals all have a telephone number within the PSTN 108.

It should be noted that the system controller 102 is capable of operating in a distributed transmission control environment that allows mixing cellular, simulcast, master/slave, or other coverage schemes involving a plurality of radio frequency transmitter/receivers 103, antennas 104 for providing reliable radio signals within a geographic area as large as a nationwide network. Moreover, as one of ordinary skill in the art would recognize, the telephonic and selective call radio communication system functions may reside in separate system controllers 102 which operate either independently or in a networked fashion.

It should be further noted that the PSTN 108 may alternatively be a private switched telephone network, and that hereinafter the abbreviation STN will be used for the telephone network and the switched radio terminals.

Figure 2:
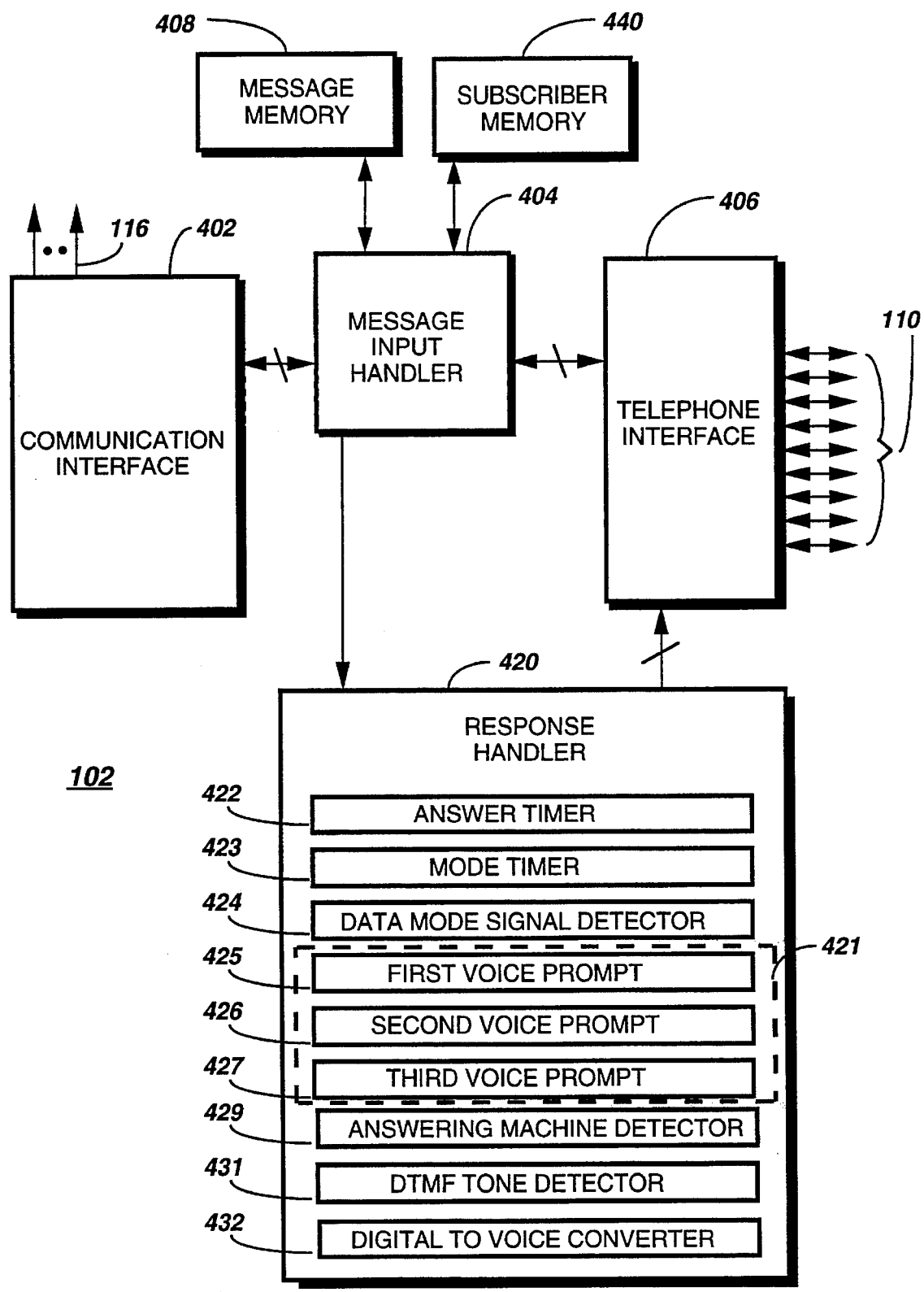
FIG. 2 is an electrical block diagram of a system controller suitable for use in the messaging system of FIG. 1, in accordance with the preferred embodiment of the present invention.

Referring to FIG. 2, an electrical block diagram of the system controller 102 is shown, in accordance with the preferred embodiment of the present invention. The system controller 102 comprises a communication interface 402, a message input handler 404, a message memory 408, a subscriber data base 440, a telephone interface 406, and a response handler 420. The communication interface 402, queues data and stored voice messages for transmission to the radio terminals, connects telephone calls for transmission to the radio terminals, and receives acknowledgments, data responses, data messages, and telephone calls from the radio terminals. The communication interface 402 is coupled to the radio frequency transmitter/receiver 103 (FIG. 1 and FIG. 2) by the links 116. The message input handler 404, which routes and processes messages, is coupled to the communication interface 402 and is further coupled to the telephone interface 406, the subscriber data base 440, the message memory 408, and the response handler 420. The telephone interface 406 handles the STN 108 (FIG. 1) physical connection, connecting and disconnecting telephone calls at the telephone links 110, and routing the audio signals between the phone links and the message input handler 404. The subscriber data base 440 stores information for each subscriber, including a correlation between the unique address assigned to each radio terminal and the telephone number used within the STN 108 to route messages and telephone calls to each radio terminal, as well as other subscriber determined preferences, such as a response delivery mode to be used when a switched radio terminal is busy. The message memory 408 stores messages, responses, and information related to the responses. The messages and responses are held in queue in the message memory 408 for scheduled delivery to messaging terminals and radio terminals. The message memory stores information determined at the time of receipt of the messages. The telephone interface 406 is further coupled to the response handler 420. The response handler 420 controls the telephone interface 406 to initiate telephone calls and deliver responses in voice or digital form to messaging terminals and switched radio terminals in a manner that is non-intrusive to a handset user, using the information stored the message memory 408, as described more fully below.

The response handler comprises an answer timer 422, a mode timer 423, a data mode signal detector 424, a voice prompting circuit 421 including a first voice prompt 425, a second voice prompt 426, and a third voice prompt 427, an answering machine detector 429, a dual tone multifrequency (DTMF) tone detector 431, and a digital to voice converter 432, the functions of which are described in detail below.

The system controller 102 is preferably a model E09PED0552 PageBridge® paging terminal manufactured by Motorola, Inc., of Schaumburg Ill., modified with special firmware elements in accordance with the preferred embodiments of the present invention, as described herein. The communication interface 402, the message input handler 404, the message memory 408, the subscriber data base 440, and the telephone interface 406 are preferably implemented within portions of the model E09PED0552 PageBridge® paging terminal which include, but are not limited to those portions providing program memory, a central processing unit, input/output peripherals, and a random access memory. The system controller alternatively could be implemented using a MPS2000® paging terminal manufactured by Motorola, Incorporated of Schaumburg, Ill. The subscriber data base 440 and message memory 408 may alternatively be implemented as magnetic or optical disk memory, which may alternatively be external to the system controller 102.

Figure 3:
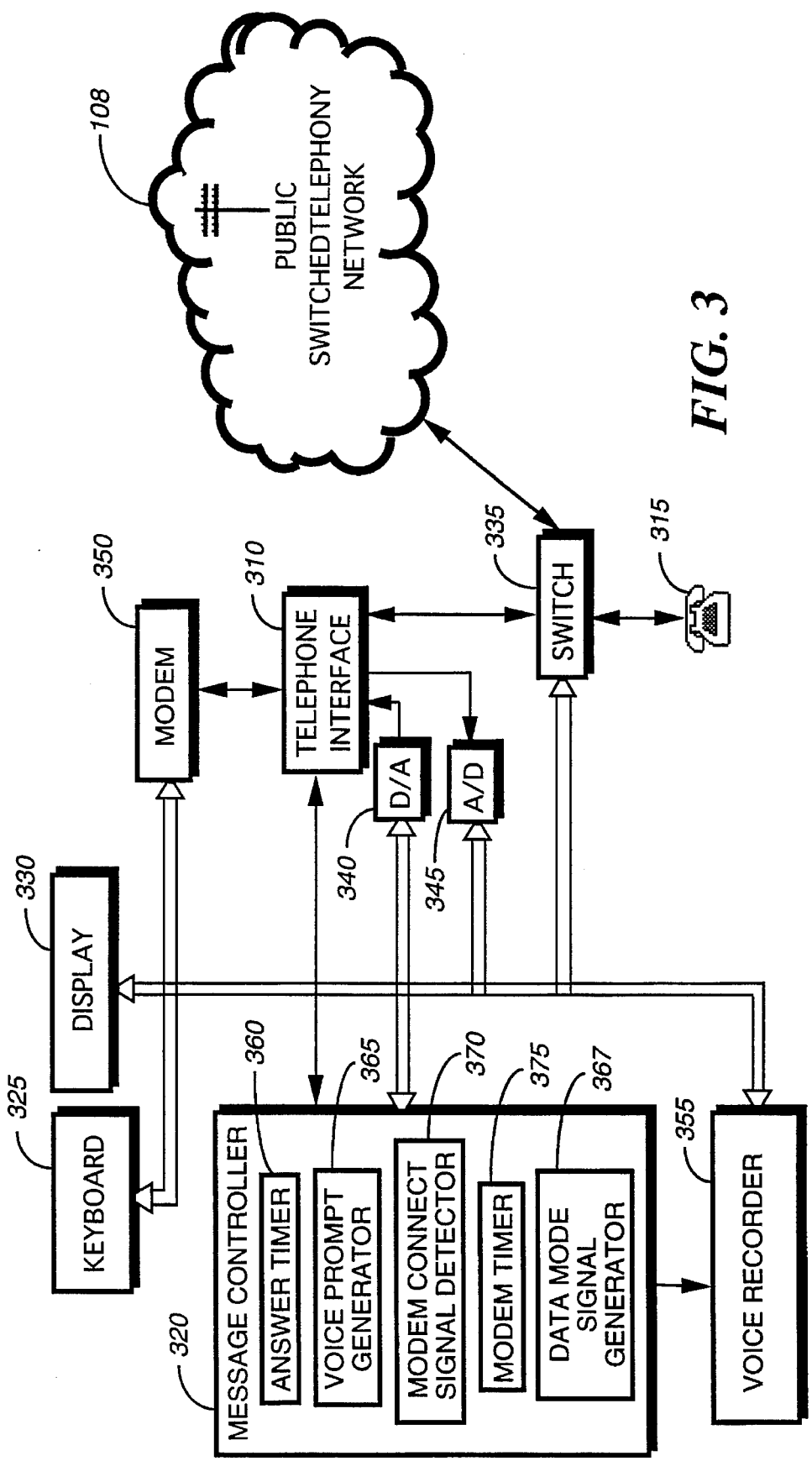
FIG. 3 is an electrical block diagram of a messaging terminal with internal voice storage capability, suitable for use in the messaging system of FIG. 1, in accordance with the preferred embodiment of the present invention.

Referring to FIG. 3, an electrical block diagram of the messaging terminal 115 with internal voice storage capability, suitable for use in the messaging system of FIG. 1, is shown in accordance with the preferred embodiment of the present invention. The messaging terminal 115 comprises a telephone interface 310, a telephone handset 315, a message controller 320, a keyboard 325, a display 330, a telephone line switch 335, a digital to analog (D/A) converter 340, an analog to digital (A/D) converter 345, a modem 350, and a voice recorder 355. The telephone line switch 335 is coupled to the switched telephone network (STN) 108, the handset 315 and the telephone interface 310. The telephone line switch 335 connects telephone calls from the STN 108 to either the handset 315 or the telephone interface 310, although when telephone calls are connected from the STN 108 to the handset, the telephone interface 310 can monitor the audio signals received and transmitted during the telephone call, including DTMF tones generated by the telephone handset 315. The handset 315 has a standard telephone keypad for entering information. The telephone line switch 335 is further coupled to the message controller 320 by a data bus, for control by the message controller 320. The A/D converter 345 is coupled to the message controller 320 and voice recorder 355 by the data bus and also coupled to the telephone interface 310, and converts an analog signal received in a phone call by the telephone interface 310 to data signals coupled to the message controller 320 and voice recorder 355. The D/A converter 340 is coupled to the message controller 320 and the telephone interface 310 by the data bus and to the telephone interface 310 by a signal, and converts digital signals coupled from the message controller 320 and voice recorder 355 into an analog signal for transmission in a phone call by the telephone interface 310. The modem 350 is coupled to the telephone interface 310 and further coupled by the data bus to the message controller 320 for converting digital information and modem connect signals sent and received by the modem 350 through the STN 108 into data bus signals usable by the message controller 320. The voice recorder 355 is a memory for storing the digitized voice responses and messages received by the messaging terminal 115 for later playback at a time convenient to the user. The voice recorder is coupled by the data bus to the A/D converter 345 and the D/A converter 340, and by a control line to the message controller 320. The keyboard 325 is coupled by the data bus to the message controller 320, and allows for user entry of messages, responses, commands, and information. The display 330 is coupled by the data bus to the message controller 320 and also provides for display of responses, messages, commands, and information.

The message controller 320 comprises an answer timer 360, a terminal voice prompt generator 365, a data mode signal generator 367, a modem connect signal detector 370, and a modem timer 375 which are used as described in detail below to accomplish the delivery of the response to the messaging terminal 115.

The messaging terminal 115 preferably comprises a model N1593A AlphaMate® desktop paging terminal manufactured by Motorola, Incorporated of Schaumburg, Ill., modified with special firmware and hardware elements and coupled to the handset 315, as described herein. The special hardware elements added to the model N1593A AlphaMate® desktop paging terminal include a DS2130 messaging processor integrated circuit manufactured by Dallas Semiconductor, Inc. of Dallas, Tex., and an MC3419 subscriber line interface switch manufactured by Motorola, Inc. of Schaumburg, Ill. The message controller 320, the keyboard 325, the display 330, the modem 350, the telephone interface 310, the D/A converter 340, the A/D converter 345, the voice recorder 355, and the telephone line switch 335 are preferably implemented within portions of the model N1593A AlphaMate® desktop paging terminal, which include, but are not limited to those portions providing program memory, a central processing unit, input/output modules, the special hardware, and a random access memory. The handset 315 is preferably a model NT4L21AA-35 handset manufactured by Northern Telecom, Inc of Nashville, Tenn., but may be one of many others available with similar characteristics.

Referring back to FIG. 1, the messaging terminal 114 preferably comprises a Presario model computer manufactured by Compaq Computer Corporation of Houston, Tex., with special software to provide the same functions provided and described above for messaging terminal 115. The messaging terminal 114 may alternatively be a desktop computer of other manufacture, similarly equipped as above, but with special software designed for the operating system used in the alternative computer. The handset for the messaging terminal 114, and for the messaging terminal 101 is preferably the same as the one for messaging terminal 115.

The messaging terminal 113 is preferably the same as the messaging terminal 115, except without the handset 315, and the messaging terminal 111 is preferably the same as the messaging terminal 114, except without the handset 315.

In a first example used with reference to FIG. 1, FIG. 2, and FIG. 3 to describe the preferred embodiment of the present invention, a message is originated for example at the telephone/computer messaging terminal 114 (FIG. 1) for delivery to a portable receiving device 106. The message is expected to elicit a response which is intended for the messaging terminal 115, so, during the telephone call which conveys the message to the system controller 102, a response telephone number for the messaging terminal 115 is also conveyed to the system controller 102, along with an indication that the messaging terminal 115 is expected to be answered in a voice mode at the telephone handset. The message input handler 404 stores the response telephone number for the messaging terminal 115 as a response telephone number in the message memory 408. The message input handler 404 also stores the indication that the messaging terminal 115 is expected to be answered at the telephone handset as a "handset expected" response type in the message memory 408, along with the message or an identifying number for the message. When the response is received from the portable receiving device 106, the message handler associates the response with the message. This is accomplished by sending the identifying message number, along with the message, to the portable receiving device 106, which returns the identifying message number back with the response. This or other methods well known to one of ordinary skill in the art may be used to associate the response with the message. The message handler then retrieves the response telephone number and the response type and routes them, along with the response, to the response handler 420, which then initiates delivery of the response to the messaging terminal 115.

In this first example, the system controller 102 establishes a telephone call with the messaging terminal 115 by dialing the response telephone number. After the call is answered by the use of the handset 315, the message controller 320 controls the telephone interface 310 to monitor the telephone call and controls the telephone line switch 335 to connect the handset 315. A first voice prompt 425 from the system controller 102 gives verbal instructions to the handset user for controlling the telephone call. The verbal instructions relate handset keypad commands that are for use by the system controller 102 and the message controller 320, to control the delivery of the response. The response can be digitally transmitted from the system controller 102 for storage in the messaging terminal 115, can be held by the system controller 102 for later retrieval by a user, or can be coupled to the handset 315 as a voice message. An example of the wording of the first voice prompt 425 of the system controller 102 is "This is the Alpha Paging System with a response from John Doe's subscriber unit. You may press 'star' to receive the response, 'pound' to have the response returned later, or activate your Alphamate Computer to capture the response." Other wording for the prompt could alternatively be stored in the system controller 102 for the first voice prompt, and be used equally well. In the alternative situation, when the call is not answered by the handset 315 after the call is established, the message controller 320 controls the telephone interface 310 to answer the telephone call and controls the telephone line switch 335 to disconnect the handset 315. The message controller 320 sends the terminal voice prompt 365 which gives instructions to a listener for storing a voice message in the voice recorder 355. An example of the wording of the terminal voice prompt 365 of the message controller 115 is "This is Joe Gone. I am away from my desk at the moment. Please leave a message after the beep and I will get back to you as soon as possible." At the conclusion of the terminal voice prompt 365, the data mode signal generator 367, recovers a data mode signal, stored in digital form in the message controller 320, which is converted to analog in the D/A converter 345 and sent by the message controller 320 to the system controller 102. The data mode signal is a predetermined set of DTMF tones, not used by standard telephones, which indicates to the system controller 102 that the response can be sent in digital form. It will be appreciated that when the calling party is not the system controller, the calling party will hear the data mode signal, sounding much like a typical answering machine beep, as an indication to start leaving a recorded voice message which will be recorded by the messaging terminal 115 in the voice recorder 355. When the calling party is the system controller, as in this example, the data mode signal will start a modem exchange between the system controller 102 and the messaging terminal 115 to digitally transfer the response from the system controller 102 into the message controller 320. It will be appreciated that the actions by users as a result of the voice prompt, and the sending of the data mode signal to the controller 102 enable the delivery of a response to the messaging terminal 115 in a manner that avoids the presentation of typically irritating, high speed (300 baud and above) modem connect tones to a handset user at the messaging terminal 115, or a handset user calling the messaging terminal 115. It will be further appreciated that the response is delivered in a manner most appropriate (digital or voice) for the answerer of the call. It will be further appreciated that the data mode signal could alternatively be a different signal, such as a three tone multifrequency signal, or a sequence of multifrequency tones selected to be non-irritating to a handset user who may listen to the signal.

It will be appreciated that the messaging terminal 114 provides functions substantially identical to those of messaging terminal 115 in the preferred embodiment of the present invention. Messaging terminals 111 and 113 provide a subset of the functions of the messaging terminal 115, limited only by the lack of a handset. It will be appreciated that the response is handled in substantially the same manner for at least some of the switched radio terminals, an example being a cellular telephone having the capability for receiving a response by means of a telephone call in voice or digital form, in accordance with the preferred embodiment of the present invention.

Figure 4:
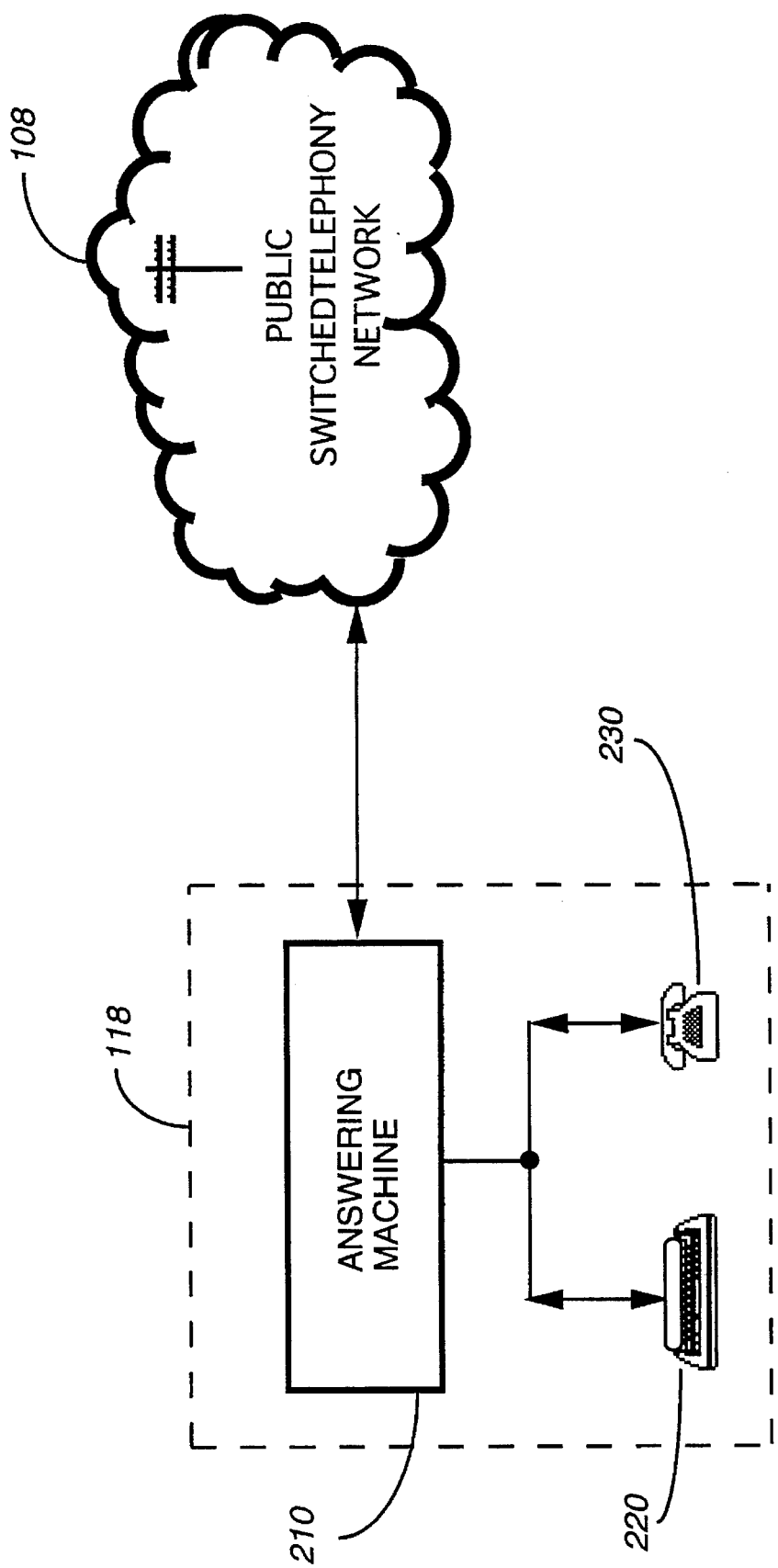
FIG. 4 is an electrical block diagram of the messaging terminal with an external answering machine, suitable for use in the messaging system of FIG. 1, in accordance with the preferred embodiment of the present invention.

Referring to FIG. 4, an electrical block diagram of the messaging terminal 118 with an external answering machine 210, suitable for use in the messaging system of FIG. 1, is shown in accordance with the preferred embodiment of the present invention. The messaging terminal 118 comprises a desktop messaging terminal 220, an answering machine 210, and a telephone handset 230. The desktop messaging terminal 220 is preferably a model N1593A AlphaMate® desktop page entry terminal manufactured by Motorola. The answering machine 210 is preferably a model 1337 answering machine manufactured by American Telephone and Telegraph Company, of New York, N. Y., although other commonly available machines will work just as well. The handset 230 is preferably the model NT4L21AA-35 handset manufactured by Northern Telecom, Inc of Nashville, Tenn., although other commonly available handsets will work just as well. The telephone line from the STN 108 is connected to a "line" connection of the answering machine 210. The handset 230 and messaging device 220 are coupled in parallel to a "telephone" connection of the answering machine, in a manner well known to one of ordinary skill in the art. The desktop messaging terminal 220 has message origination capability and no answering capability.

In a second example used herein to describe the preferred embodiment of the present invention, a message is originated at the messaging terminal 118 (FIG. 1) for delivery to a portable receiving device 106. The message is expected to elicit a response which is needed at the messaging terminal 118, so, during the telephone call which conveys the message to the system controller 102, a response telephone number for the messaging terminal 118 is also conveyed to the system controller 102, along with an indication that the messaging terminal 115 is expected to be answered in a voice mode at the telephone handset. The response is associated with the response telephone number by the system controller 102 in the same manner as described above with reference to FIG. 3.

In this second example, the system controller 102 establishes a telephone call with the messaging terminal 118 by dialing the response telephone number. The call is answered by a handset user or the answering machine 210. A first voice prompt 425 from the system controller 102 gives instructions to the handset user for controlling the telephone call and is coupled to the handset 230 and answering machine 210. When the telephone call is answered using the handset 230, commands may be entered at the telephone keypad for initiating a voice version of the response from the system controller, or for holding the response for later delivery. When the telephone call is answered by the answering machine 210, there are no commands returned in response to the first voice prompt. The system controller 102, after a predetermined delay, sends a voice form of the response when a "deliver on no response" option is set to a first value, and stores the response for later delivery when the "deliver on no response" option is set to a second value. It will be appreciated that the interaction with the system controller enables the delivery of the response in voice form to the messaging terminal 118 and avoids the presentation of any irritating, high speed (300 baud and above) modem connect tones (which might be used in other systems to establish the existence of a digital device messaging terminal at the telephone response number) to the handset user at the messaging terminal 118. It will be further appreciated that the response is delivered in a manner most appropriate (voice) for the answerer of the call. It will also be appreciated that the interaction of the messaging terminal 101, which is solely a telephone handset, with the system controller 102 in the preferred embodiment of the present invention, will be substantially the same as the interaction described above for the messaging terminal 118, except for the lack of answering machine functions in the messaging terminal 101.

Figure 5:
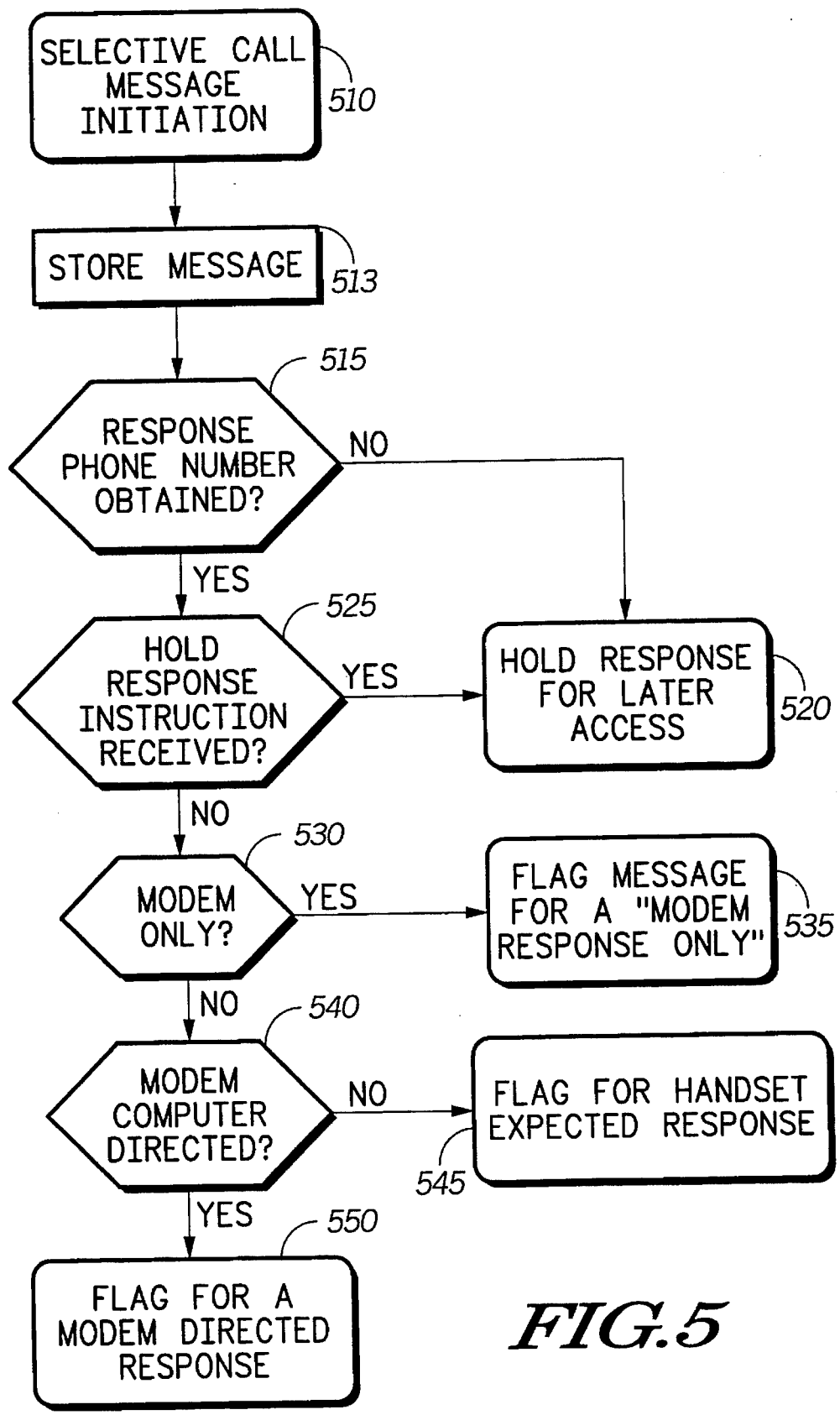
FIG. 5 shows a flow chart which illustrates the method of managing message initiations provided by the system controller of FIG. 2, in accordance with the preferred embodiment of the present invention.

FIG. 5 shows a flow chart which illustrates a method of managing message initiations, used in the system controller of FIG. 2, in accordance with the preferred embodiment of the present invention. At step 510, an originator establishes an origination telephone call to the system controller. The originator may be a person using a telephone handset such as the one at messaging terminal 101, 114, 115, or 118. The originator may alternately be a desktop messaging terminal or computer such as the messaging terminal 111, 113, 114, 115, or 118 having a digital message stored therein. The message is intended for delivery by the system controller 102 to a recipient, which may be a radio terminal, or another messaging terminal 101, 111, 113, 114, 115, or 118. During the origination telephone call, the message is transferred to the system controller 102, in digital or voice form, depending on the originator and the intended recipient, and stored, at step 513, in the message memory 408 for delivery to the recipient and for association with a response returned from the recipient. During the origination telephone call, a response telephone number is determined by the system controller in the event a response to the message is received by the system controller 102 from the recipient. The response telephone number is the telephone number for a messaging terminal or a switched radio terminal. The response telephone number is obtained, at step 515, from the originator when response telephone number is communicated to the system controller 102 during the origination telephone call, such as by entry following a unique sequence of DTMF commands, or following a unique voice prompt, when the originator is a person. Alternatively, the response telephone number may be communicated in a predetermined portion of a digital message when the originator is a messaging device or computer, at step 515. These methods and others are well known to one of ordinary skill in the art. When the originator does not explicitly communicate a response telephone number during the origination telephone call, and when an option in the system controller 102 is set for using the originating telephone number as the response telephone number, the response telephone number is obtained, using an automatic number identification (ANI), from the originating telephone number communicated to the system controller 102 by the STN 108 during the establishment of the telephone call, at step 515. When the originator does not explicitly communicate a response telephone number during the origination telephone call, and when an option in the system controller 102 is not set for using the originating telephone number as the response telephone number, and when an option to use a default response telephone number is set, the response telephone number is obtained from a default response telephone number which is stored for each subscriber in the subscriber data base 440 of the system controller 102, at step 515.

When no response telephone number is obtained at step 515, a response type of "hold response", and a predetermined telephone number indicating that no response telephone number was obtained, are stored in the message memory 408, in correspondence with the message, at step 520. When a response telephone number is obtained at step 515, the response telephone number is stored in the message memory 408, in correspondence with the message, at step 515. A response type is determined, when the originator is a person, by voice prompts from the system controller 102, followed by keypad activations by the person, which result in standard DTMF tones (the DTMF tones representing the digits, the pound sign, and the asterisk sign) being transmitted to the system controller 102, where the DTMF tones are detected and used to determine the response type. When the originator is a messaging device, the response type is indicated in a data sequence communicated during the telephone call by data in a predetermined portion of the data sequence, or by data preceded by a predetermined unique sequence of symbols, or by other methods well known to those of ordinary skill in the art. When the response type is determined to be a "hold" response type at step 525, the "hold" response type is stored in the message memory 408, in association with the message stored therein, at step 520. When the response type is determined to be a "modem only" type response at step 530, the "modem only" response type is stored in the message memory 408, in association with the message stored therein, at step 535. When the response type is determined to be a "modem directed" type response at step 540, the "modem directed" response type is stored in the message memory 408, in association with the message stored therein, at step 550. When the response type is determined to be a "handset expected" type response at step 540, or when no response is received from the originator at step 540, the "handset expected" response type is stored in the message memory 408, in association with the message stored therein, at step 545.

When a response is received at the message input handler 404 from the recipient, an association is made by the message input handler 404 between the response and the message, and thereby also to the response telephone number and the response type corresponding to the message, as described above in conjunction with the first example. When the response type is "modem only", "modem expected", or "handset expected", the response is delivered to the messaging terminal at the associated response telephone number according to the response type, under the control of the response handler, as is described below.

Figure 6:
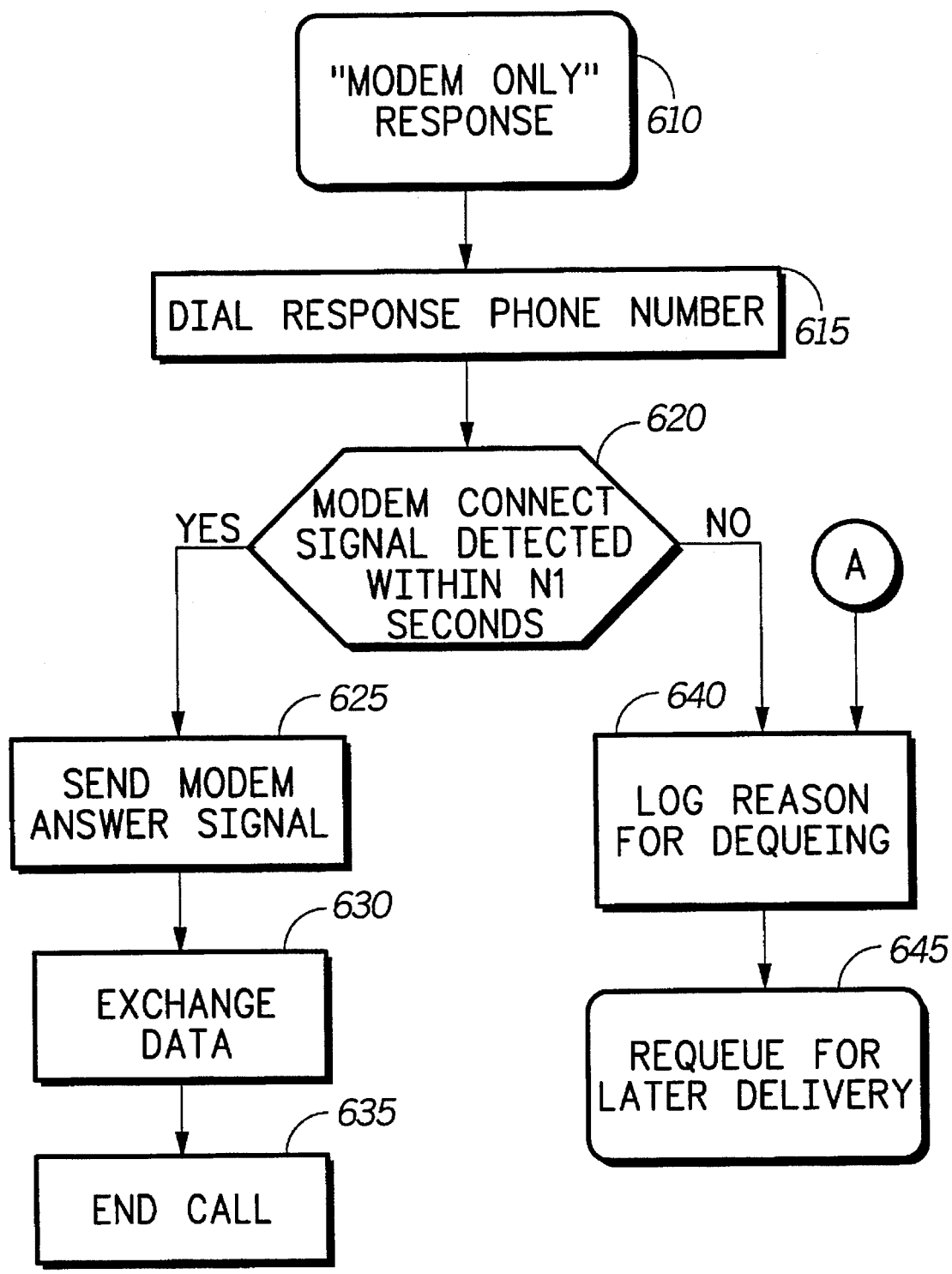
FIG. 6 shows a flow chart which illustrates the method of managing a "modem only" response provided by the system controller of FIG. 2, in accordance with the preferred embodiment of the present invention.

FIG. 6 shows a flow chart which illustrates a method of managing a "modem only" response used in the system controller of FIG. 2, in accordance with the preferred embodiment of the present invention. A "modem only" type response for messaging terminal 111 is determined by the message input handler 404, as described above, at step 610. At step 615, the response handler 420 initiates a response telephone call by means of the telephone interface 406, by dialing the response telephone number, which is the telephone number for messaging terminal 111. When the response telephone number is dialed, the response handler 420 starts the answer timer 422, having a first predetermined duration until expiration. The first predetermined duration of the answer timer 422 is typically selected for an expectation of answer by a messaging terminal which only answers telephone calls by modem means, such as messaging terminals 111 and 113, wherein the answer typically requires at most the equivalent of two telephone rings. When the response telephone call is answered by messaging terminal 111 with the receipt by the response handler 420 of one of a predetermined set of modem connect signals prior to the expiration of the answer timer 422 at step 620, the predetermined modem connect signal is detected by the telephone interface 406 and communicated to the response handler. The response handler 420 interrupts the answer timer 422, preventing the answer timer 422 from expiring until started again, and commands the telephone interface 406 to send a predetermined modem response signal, at step 625. The modem connect and response signals are preferably those specified in CCITT (The International Telegraph and Telephone Consultive Committee) standards for modems. When the messaging terminal 111 and the response handler 420 have established a data transfer speed and protocol in accordance with the CCITT specifications, the response is transmitted in digital form to the messaging terminal 111, at step 630. When the exchange of data is completed, the response telephone call is ended at step 635.

At step 620, when the response telephone call is not answered prior to the expiration of the answer timer 422, the answer timer 422 expires and the response handler 420 logs a reason for retrying the response at a later time, which is "no answer" in this instance, in the message memory, at step 640, and requests the response for a later delivery attempt, at step 645.

Figure 7:
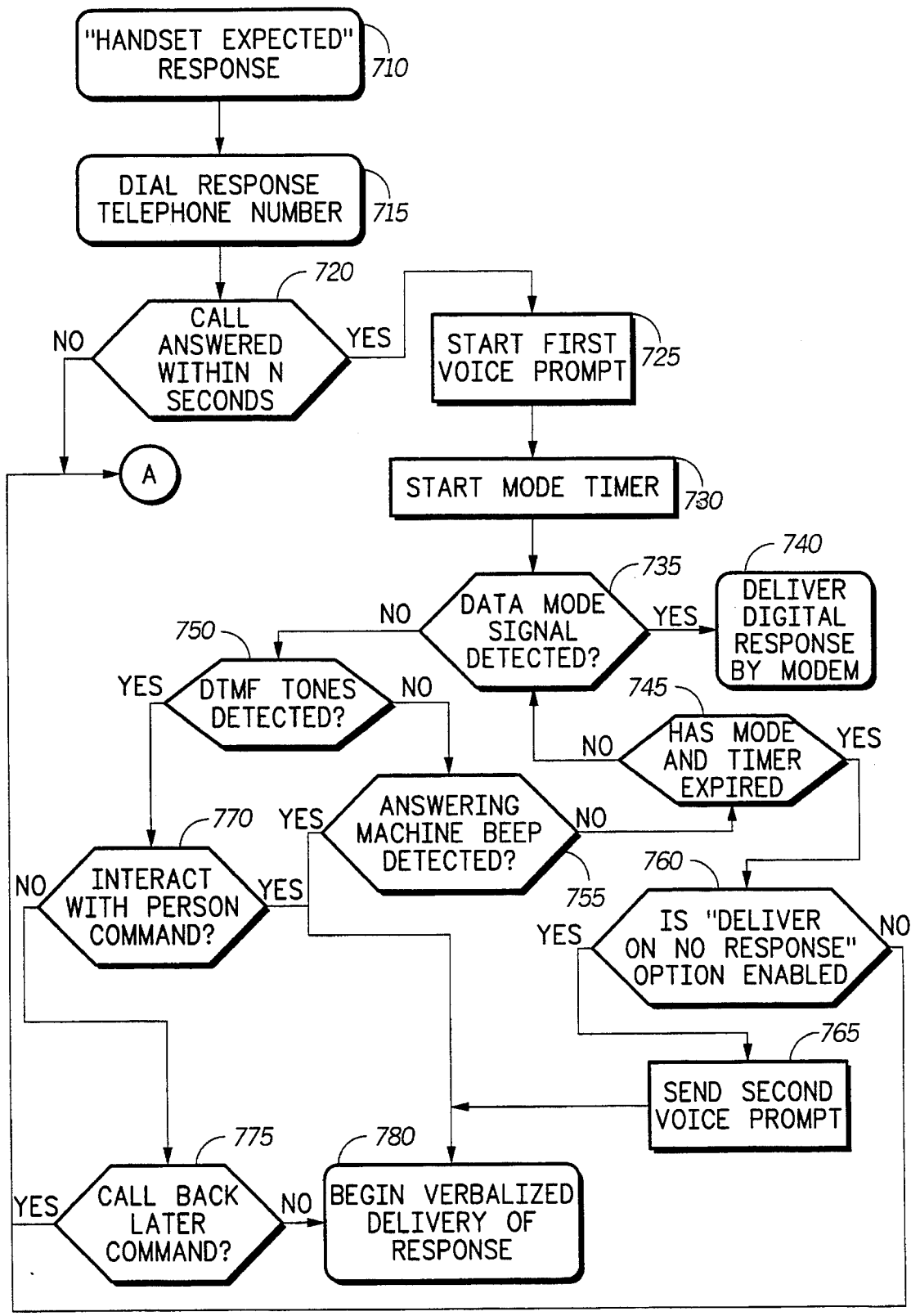
FIG. 7 shows a flow chart which illustrates the method of managing "voice expected" response provided by the system controller of FIG. 2, in accordance with the preferred embodiment of the present invention.

FIG. 7 shows a flow chart which illustrates a method of managing "handset expected" response used in the system controller of FIG. 2, in accordance with the preferred embodiment of the present invention. A "handset expected" type response for messaging terminal 115 is determined by the message input handler 404, as described above, at step 710. At step 715, the response handler 420 initiates a response telephone call by means of the telephone interface 406, by dialing the response telephone number, which is the telephone number for messaging terminal 115. When the response telephone number is dialed, the response handler 420 starts the answer timer 422, having a second predetermined duration until expiration. The second predetermined duration of the answer timer 422 is selected for an expectation of answer by a messaging terminal which may answer telephone calls by telephone handset or messaging device or computer means, such as messaging terminals 114 and 115, wherein the answer may typically require the equivalent of several telephone rings. At step 720, when the response telephone call is answered prior to the expiration of the answer timer 422, the response handler interrupts the answer timer 422, preventing the answer timer 422 from expiring unless started again, and a coupling of the first voice prompt 425 is initiated from the response handler 420 to the telephone line by the telephone interface 406, at step 725. The first voice prompt 425 is generated by the voice prompting circuit 421, within the response handler 420. When the first voice prompt 425 has been initiated at step 725, the mode timer 423 having a third predetermined duration until expiration is started at step 730. The third predetermined duration is typically selected to allow the messaging terminal 115 to send the terminal voice prompt and the data mode signal described above. When the data mode signal is received prior to the expiration of the mode timer 423 and detected by the data mode signal detector 424, at step 735, the response handler 420 interrupts the mode timer 423, preventing the mode timer 423 from expiring unless started again, and commands a delivery of the response by a digital mode to the messaging terminal 115, starting with a modem connect signal sent from the system controller 102 to the messaging terminal 115, sending the response in digital form to the messaging terminal 115, and terminating the call, at step 740.

At step 720, when the response telephone call is not answered prior to the expiration of the answer timer 422, the answer timer 422 expires and the response handler delivers the response using a retry response mode, logging a reason for retrying the response at a later time, which is "no answer" in this instance, in the message memory, at step 640, and requeuing the response for a later delivery attempt, at step 645.

When the data mode signal is not received prior to the expiration of the mode timer 423, at step 735 and when one or more DTMF signals are detected by the DTMF tone detector 431, the response handler 420 determines what predetermined DTMF sequence is received using the DTMF tone detector 431. When a first predetermined DTMF sequence, which indicates that a voice form of the response should be used, is detected by the DTMF tone detector 431, at step 770, the response handler 420 delivers the response using a voice mode, and interrupts the mode timer 423, preventing the mode timer 423 from expiring unless started again. The response handler 420 delivers the response in voice form, using the voice mode, by converting the digital form of response stored in the message memory 408 to a voice form of response using the digital to voice converter 432, and coupling the voice form of response through the telephone interface 406 to the messaging terminal 115, at step 780. The digital to voice converter 432 comprises a set of stored digitized voice segments corresponding to information commonly encountered in the messaging system 100, such as the numerical digits, common symbols, and common words, such as "call", "me", etc. When a second predetermined DTMF sequence, which indicates that the response should be tried again later, is received from the messaging terminal 115, and detected by the DTMF tone detector 431 step 775, the response handler 420 interrupts the mode timer 423, preventing the mode timer 423 from expiring unless started again, and delivers the response using the retry response mode, as described above, with the reason for retrying the response at a later time being logged as "terminal directed retry". When the data mode signal is not received, at step 735 and DTMF signals are not detected by the DTMF tone detector 431 at step 750, prior to the expiration of the mode timer 423, and when the answering machine detector 429 detects an answering machine beep, at step 755, the response handler 420 interrupts the mode timer 423, preventing the mode timer 423 from expiring unless started again, and delivers the response using the voice mode as described above. When the data mode signal is not received at step 735, DTMF signals are not detected by the DTMF tone detector 431 at step 750, and the answering detector 429 does not detect an answering machine beep, at step 755, prior to the expiration of the mode timer 423, at step 745, the response controller 420 continues the process at step 735. When the mode timer 423 expires, at step 745, and when a delivery option in the message memory 408 is not set, at step 760, the response handler 420 continues the process at step 640. When the mode timer 423 expires, at step 745, and when the delivery option in the message memory 408 is set, at step 760, the response handler 420 generates a second voice prompt 426 at step 765 and then delivers the response using the voice mode, at step 780. The second voice prompt 426 is generated by the voice prompting circuit 421, within the response handler 420. The second voice prompt 765 wording is "due to no selection of mode, a response is being transmitted in the voice mode", although other wording could be stored for the second voice response and used equally well. When the mode timer 423 expires, at step 745, and when a delivery option in the message memory 408 is set, the response handler 420 delivers the response using the retry response mode, as described above.

Figure 8:
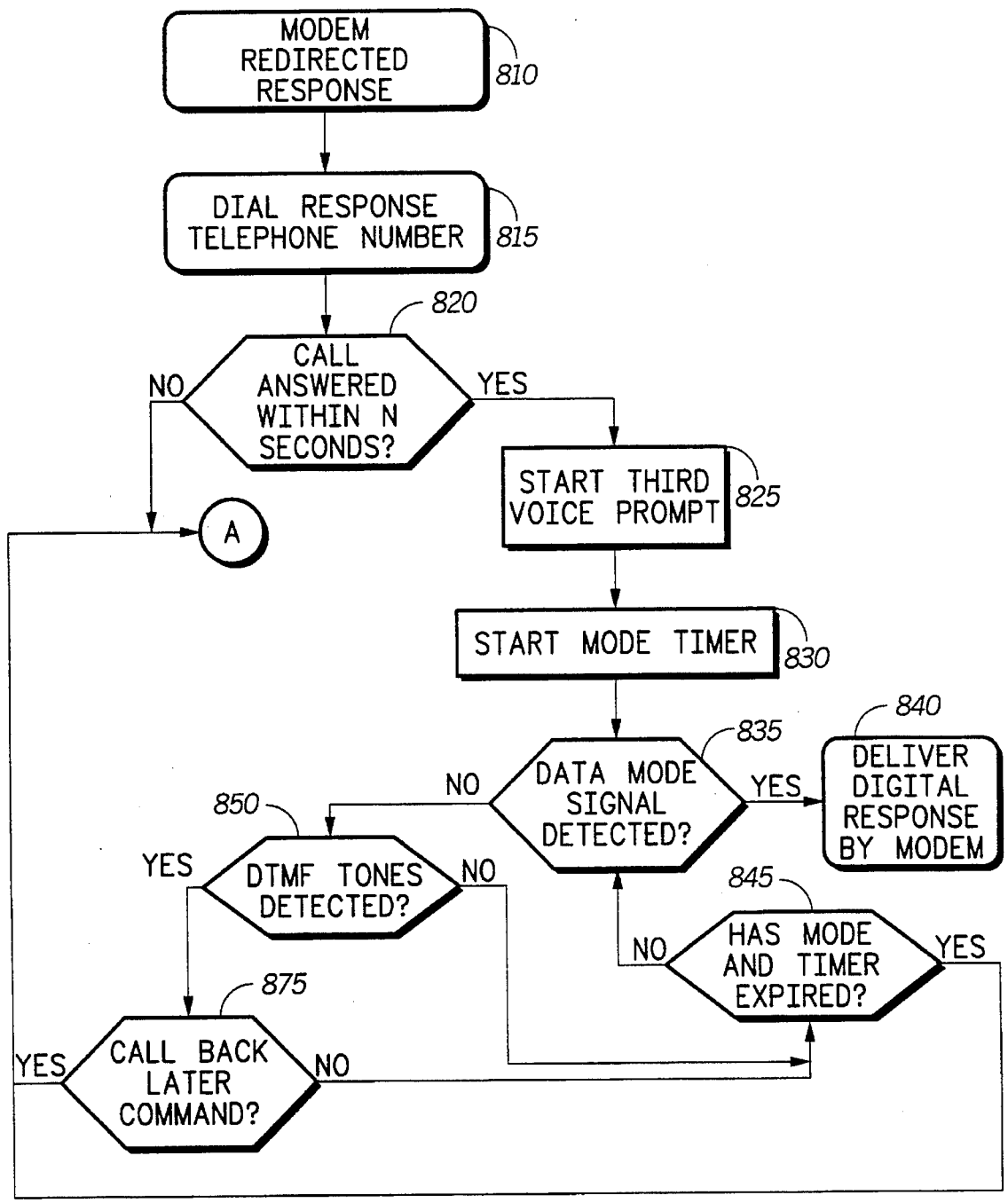
FIG. 8 shows a flow chart which illustrates the method of managing "modem directed" response provided by the system controller of FIG. 2, in accordance with the preferred embodiment of the present invention.

FIG. 8 shows a flow chart which illustrates a method of managing "modem directed" response used in the system controller of FIG. 2, in accordance with the preferred embodiment of the present invention. A "modem directed" type response for messaging terminal 115 is determined by the message input handler 404, as described above, at step 810. At step 815, the response handler 420 initiates the response telephone call by means of the telephone interface 406, by dialing the response telephone number, which is the telephone number for messaging terminal 115. When the response telephone number is dialed, the response handler 420 starts the answer timer 422, having the second predetermined duration until expiration. At step 820, when the response telephone call is answered prior to the expiration of the answer timer 422, the response handler interrupts the answer timer 422, preventing the answer timer 422 from expiring unless started again, and a coupling of the third voice prompt 427 is initiated from the response handler 420 to the telephone line by the telephone interface 406, at step 825. The third voice prompt 425 is generated by the voice prompting circuit 421, within the response handler 420. The wording of the third voice prompt 427 is "This is the Alpha Paging System with a digital response for the messaging device associated with this telephone number. Please enable the device or press the pound key to have the response sent at a later time", although other wording could be stored for the third voice prompt 427 and be used equally well. When the third voice prompt 427 has been initiated at step 825, the mode timer 423 having the third predetermined duration until expiration is started at step 830. When the data mode signal is received prior to the expiration of the mode timer 423 and detected by the data mode signal detector 424, at step 835, the response handler 420 interrupts the mode timer 423, preventing the mode timer 423 from expiring unless started again, and commands a delivery of the response by a digital mode to the messaging terminal 115, starting with a modem connect signal sent from the system controller 102 to the messaging terminal 115, continuing by sending the response in digital form to the messaging terminal 115, and terminating the call, at step 840.

At step 820, when the response telephone call is not answered prior to the expiration of the answer timer 422, the answer timer 422 expires and the response handler 420 delivers the response using the retry response mode, logging a reason for retrying the response at a later time, which is "no answer" in this instance, in the message memory, at step 640, and requeuing the response for a later delivery attempt, at step 645.

When the data mode signal is not received prior to the expiration of the mode timer 423, at step 835 and when one or more DTMF signals are detected by the DTMF tone detector 431, the response handler 420 determines what predetermined DTMF sequence is received using the DTMF tone detector 431. When a second predetermined DTMF sequence is received from the messaging terminal 115 and detected by the DTMF tone detector 431 at step 875, the response handler 420 interrupts the mode timer 423, preventing the mode timer 423 from expiring unless started again, and delivers the response using the retry response mode, as described above, with the reason for retrying the response at a later time being logged as "terminal directed retry". When the data mode signal is not received at step 835 and DTMF signals are not detected by the DTMF tone detector 431 at step 850, prior to the expiration of the mode timer 423, at step 845, and the response handler 420 continues the process at step 835. When the mode timer expires, at step 845, the response handler 420 delivers the response using the retry response mode, as described above, with the reason for retrying the response at a later time being logged as "no data mode signal received".

Figure 9:
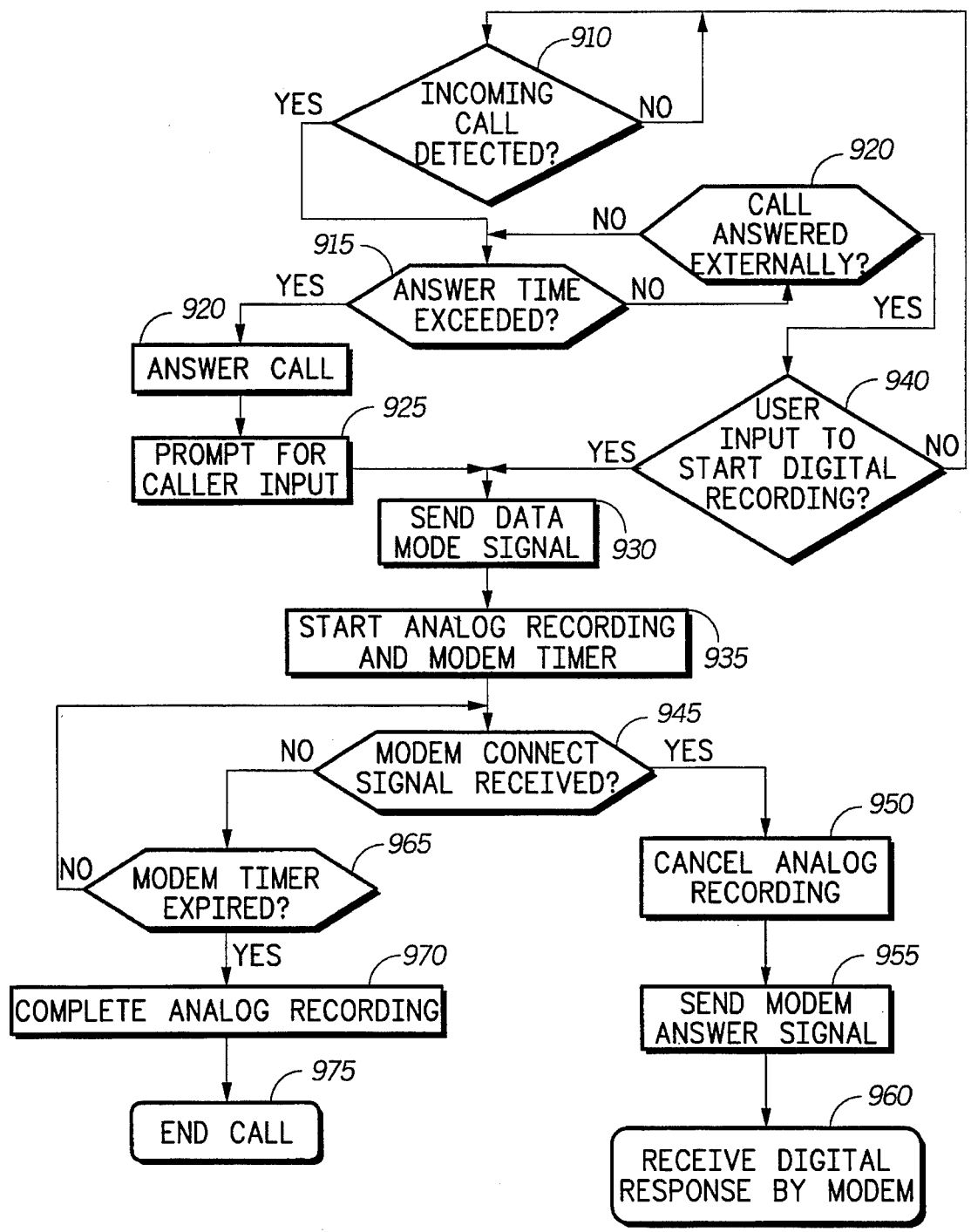
FIG. 9 shows a flow chart which illustrates the method of managing the receipt of responses used in the messaging terminals of FIG. 3 and FIG. 4, in accordance with the preferred embodiment of the present invention.

FIG. 9 shows a flow chart which illustrates a method of managing the receipt of responses used in the messaging terminal 115 of FIG. 3, in accordance with the preferred embodiment of the present invention. It will be appreciated that the messaging terminal 114 comprises elements substantially equivalent to those of messaging terminal 114, and functions in substantially the same manner as messaging terminal 114. When an incoming telephone call is detected, at step 910, by the telephone interface 310, the detection event is coupled to the message controller 320 by a signal. The message controller 320 starts the answer timer 360, having a predetermined duration until expiration, at step 915. The predetermined duration of the answer timer 360 is selected for an expectation of answer by a handset user, which may typically be equivalent to several telephone rings. At step 915, when the response telephone call is not answered prior to the expiration of the answer timer 422, the answer timer 422 expires and the message controller 320 sends a terminal voice prompt, which was described above, at step 925. At the conclusion of the voice prompt, the data mode signal, also described above, is sent, at step 930. The terminal voice prompt and the data mode signal are preferably stored as digital signals in the message controller 320, which are converted to analog signals by the D/A converter 340.

At step 920, when the response telephone call is answered prior to the expiration of the answer timer 360, the message controller 320 interrupts the answer timer 360, preventing the answer timer 360 from expiring unless started again, and the message controller 320 monitors the telephone line output audio through the A/D converter 345, for a predetermined sequence of DTMF tones which indicate that the handset user has decided to return control of the response telephone call to the message controller 320 for digital receipt of the response. When the predetermined sequence of DTMF tones which indicate that the handset user has decided to return control of the response telephone call is detected, at step 940, the message controller 320 disconnects the handset from the telephone call and sends the data mode signal to the system controller 102, at step 930, performing a digital to analog conversion of the data mode signal using the D/A converter 340. When the predetermined sequence of DTMF tones which indicate that the handset user has decided to return control of the response telephone call are not received during the telephone call, at step 940, the process is continued, at step 910, awaiting a next telephone call.

After the data mode signal is sent, at step 930, the message controller 320 starts the voice recorder 355, which begins storing in memory the audio received during the remainder of the telephone call, at step 935. The received audio is preferably converted from analog form to digital form by the A/D converter 345, and stored digitally, although other forms of recording, such as analog signal on magnetic tape, could be used. Also, at step 935, the modem timer 375, which has a predetermined duration until expiration, is started. When a modem connect signal is not detected by the modem connect signal detector 370 prior to the expiration of the modem timer 375, at step 945, the modem timer 375 expires, at step 965 and the voice recorder 355 continues to record the audio received during the telephone call, at step 970, until the telephone call is ended, at step 975.

When a modem connect signal is detected by the modem connect signal detector 370 prior to the expiration of the modem timer 375, at step 945, the message controller 320 interrupts the modem timer 375, preventing the modem timer 375 from expiring until restarted, and cancels the analog recording, at step 950, which was started at step 935. The message controller 320 then sends a modem answer signal at step 955. The calling device in this example is the system controller 102 delivering a response, so a modem answer signal and the digital response are received at step 960, ending the telephone call.

It will be appreciated that in a system wherein responses are managed by the system controller 102 for delivery to the terminal devices 114 and 115, as described herein, in accordance with the preferred embodiment of the present invention, the following useful features are provided:

1. The logical interaction between the system controller and the messaging terminals is coordinated to allow non-intrusive coexistence with people using the same facilities.
2. The messaging system may be provided information concerning the intended receiver of the response.
3. Based on the known nature of the intended receiver of the response, the messaging system controller has a preferred interactive logical flow with the messaging terminal.
4. The messaging terminals designed to generate and receive digital messages and responses, are designed to provide the appropriate information to the controller at the time of message origination.
5. The messaging terminals are capable of providing the additional service of answering machine type operation, in order to implement a functionally clean interface to a voice caller from inside or outside the messaging system. This can be achieved by either implementing the answering machine function internally, or providing a connection to a external answering machine.
6. The system controller and the messaging terminal entry and response devices select between verbalized and modem communications as appropriate to the form of response, user, and terminal type.

I claim:

1. A method for delivering a response to a message, the response communicated through a messaging system comprising a switched telephone network (STN) to a messaging terminal at a response telephone number, using a system controller, wherein the messaging terminal includes at least one of a voice receive mode and a data receive mode, and wherein the system controller comprises a telephone interface, a message input handler, a message memory, and a telephone response handler, said method comprising the steps of:

receiving the message and the response telephone number by the message input handler;

storing, in the message memory, the message and the response telephone number corresponding thereto;

associating the message stored in the message memory with a response received by the system controller;

retrieving from the message memory the response telephone number corresponding with the message associated with the response;

delivering the response, using the retrieved response telephone number to establish a response telephone call coupled from the telephone interface through the STN to the messaging terminal, the response delivered in accordance with the receive mode of the messaging terminal and, wherein the messaging system further comprises a selective call radio communication system and wherein the response is received at the system controller, by the message input handler, for delivery to the messaging terminal, from a selective call radio terminal device.

2. The method according to claim 1 wherein the response is an acknowledgment from the selective call radio terminal device.

3. The method according to claim 1 wherein the response is received at the system controller, by the message input handler, for delivery to the messaging terminal, from a responding messaging terminal.

4. The method according to claim 1 wherein the message is originated by a telephone call from an origination telephone number and the response telephone number is defined to be the origination phone number.

5. The method according to claim 1, wherein the response is received by the system controller in digital form and the system controller further comprises a data to voice converter, said step of delivering further comprising the steps of:

determining the receive mode of the messaging terminal;

converting the response from digital form to voice form by the data to voice converter and communicating the voice form of the response to the messaging terminal, when the determined receive mode of the messaging terminal is the voice receive mode; and communicating the digital form of the response to the messaging terminal, when the determined receive mode of the messaging terminal is the data receive mode.

6. The method according to claim 5, wherein the system controller further comprises a mode signal detector, and wherein when the response telephone call is established in said step of delivering the response, said step of determining the receive mode comprises the following steps:

sending a voice prompt to the messaging terminal;

starting an mode timer having a predetermined duration until expiration when not interrupted, and having no expiration when interrupted;

identifying the receive mode of the messaging terminal as the data receive mode and interrupting the mode timer identifying the receive mode of the messaging terminal as the voice receive mode, when the mode timer expires.

7. The method according to claim 5, wherein the messaging terminal further includes a retry mode for indicating that a response delivery is to be attempted later, the method further comprising the step of:

queuing the response for a later delivery attempt, when the messaging terminal is in the retry receive mode.

8. The method according to claim 7, wherein the system controller further comprises a mode signal detector, and wherein when the response telephone call is established in said step of delivering the response, said step of determining the receive mode comprises the following steps:

sending a voice prompt to the messaging terminal;

starting an mode timer having a first predetermined duration until expiration when not interrupted, and having no expiration when interrupted;

identifying the mode of the messaging terminal as the data receive mode and interrupting the mode timer when a first mode signal is detected prior to the expiration of the mode timer;

identifying the receive mode of the messaging terminal as the voice receive mode and interrupting the mode timer, when a second mode signal is detected prior to the expiration of the mode timer; and identifying the mode of the messaging terminal as the retry receive mode, when the mode timer expires.

9. The method according to claim 8, wherein the system controller further includes a retry receive mode, and wherein when the response telephone call is established in said step of delivering the response, said step of determining the receive mode comprises the following step:

identifying the receive mode of the messaging terminal as the retry receive mode and interrupting the mode timer, when a third mode signal is detected prior to the expiration of the mode timer.

10. The method according to claim 7 wherein a response type is communicated to the system controller by an originator of the message, the response type being one of a modem only response and a modem directed response;

wherein the step of receiving the message further comprises the step of:

receiving the response type by the message input handler; wherein the step of storing further comprises the step of:

storing the response type;

wherein the step of associating further comprises the step of:

associating the message stored in the message memory with the response received by the system controller;

wherein the step of retrieving further comprises the step of:

retrieving from the message memory the response type corresponding with the response; and wherein the step of delivering the response further comprises the step of:

delivering the response, using the response type.

11. The method according to claim 10 wherein when the response type is the modem only response, said step of delivering further comprises the step of:

communicating the digital response to the messaging terminal.

12. The method according to claim 10, wherein the system controller further comprise a mode signal detector, and wherein when the response type is the modem directed response, said step of delivering further comprises the steps of:

sending a voice prompt to the messaging terminal;

starting an mode timer having a first predetermined duration until expiration when not interrupted, and having no expiration when interrupted;

identifying the receive mode of the messaging terminal as the data receive mode and interrupting the mode timer, when a first mode signal is detected prior to the expiration of the mode timer; and identifying the receive mode of the messaging terminal as the retry receive mode, when the mode timer expires.

13. A system controller operating in a messaging system for delivering a response to a message, the response communicated through a messaging system comprising a switched telephone network (STN) to a messaging terminal at a response telephone number, wherein the messaging terminal includes at least one of a voice receive mode and a data receive mode, said system controller comprising:

a telephone interface coupled to the STN for connecting telephone calls to and from the STN;

a message input handler coupled to said telephone interface for receiving the message and the response telephone number during a telephone call;

a message memory, coupled to said message input handler for storing the response telephone number in correspondence with the message;

said message input handler further for receiving the response and associating the message stored in said message memory with the response and for retrieving from said message memory the response telephone number corresponding with the message associated with the response; and a telephone response handler, coupled to said message input handler and said telephone interface for delivering the response in accordance with the receive mode of the messaging terminal, using the retrieved response telephone number to establish a response telephone call coupled from said telephone interface through the STN to the messaging terminal and, wherein the messaging system further comprises a selective call radio communication system comprising one or more selective call radio terminal devices and at least one transmitter/receiver, said system controller further comprising:

communications interface means, coupled to said message handler means and the transmitter/receiver, for receiving the response from one of the one or more selective call radio terminal devices, for delivery to the messaging terminal.

14. The system controller according to claim 13 wherein the response is received at the system controller, by the message input handler, for delivery to the messaging terminal, from a responding messaging terminal.

15. The system controller according to claim 13, wherein the response is received by the message handler in digital form, further comprising:

a digital to voice converter, coupled to said message handler, for converting the response from digital form to voice form when the receive mode of the messaging terminal has been identified to be the voice receive mode.

16. The system controller according to claim 15, wherein the response handler further comprises:
- a voice prompt for generating a voice prompt coupled to the messaging terminal when the response telephone call is established;
- a data mode signal detector which identifies the mode of the data messaging terminal as the data mode when a data mode signal is detected; and
- a mode timer for identifying the mode of the messaging terminal as the voice mode when the data mode signal has not been received within a predetermined time period.

17. The system controller according to claim 16, wherein the messaging terminal further includes a retry mode for indicating that a response delivery is to be attempted later, wherein the response handler further comprises:
- a voice mode signal detector which identifies the mode of the messaging terminal to be the voice mode when a voice mode signal is detected; and wherein
- the mode timer identifies the mode of the messaging terminal as the retry mode when the data mode signal has not been received and the voice mode signal has not been received within a predetermined time period.

* * * * *

UNITED STATES PATENT AND TRADEMARK OFFICE
CERTIFICATE OF CORRECTION

PATENT NO. : 5,457,732
DATED : October 10, 1995
INVENTOR(S) : Steven Jeffrey Goldberg It is certified that error appears in the above-indentified patent and that said Letters Patent is hereby corrected as shown below:

Column 15, line 16, change "response controller 420" to --the response handler 420--.

Column 15, line 32, insert --not-- after "408 is".

Signed and Sealed this

Thirteenth Day of August, 1996

Attest:

BRUCE LEHMAN

*Attesting Officer*  Commissioner of Patents and Trademarks